United States Patent
Hassbring

(10) Patent No.: US 12,283,113 B2
(45) Date of Patent: Apr. 22, 2025

(54) METHOD AND DEVICE FOR DETERMINING THAT A DETECTED OBJECT BELONGS TO A SPECIFIC CLASS

(71) Applicant: Axis AB, Lund (SE)

(72) Inventor: Ludvig Hassbring, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/606,543

(22) Filed: Mar. 15, 2024

(65) Prior Publication Data

US 2024/0355127 A1    Oct. 24, 2024

(30) Foreign Application Priority Data

Apr. 24, 2023 (EP) .................................. 23169423

(51) Int. Cl.
```
G06V 20/40      (2022.01)
G06T 7/223      (2017.01)
G06V 20/58      (2022.01)
```
(52) U.S. Cl.
CPC .............. *G06V 20/58* (2022.01); *G06T 7/223* (2017.01); *G06V 20/40* (2022.01); *G06V 2201/07* (2022.01); *G06V 2201/10* (2022.01)

(58) Field of Classification Search
CPC ........ G06V 20/58; G06V 20/49; G06V 20/41; G06V 20/40; G06V 2201/07; G06V 2201/10; G06V 2201/08; G06V 10/811; G06V 10/25; G06V 10/765; G06V 10/82;
(Continued)

(56) References Cited

U.S. PATENT DOCUMENTS

| 8,548,211 B2 * | 10/2013 | Casillas ................ G06F 16/583 |
| | | 382/118 |
| 2004/0141633 A1 * | 7/2004 | Horie ...................... G06T 7/254 |
| | | 348/E7.087 |
| 2007/0258646 A1 | 11/2007 | Sung et al. |

(Continued)

FOREIGN PATENT DOCUMENTS

| CN | 111814768 B | 12/2020 |
| EP | 4090036 A1 | 11/2022 |

OTHER PUBLICATIONS

Extended European Search Report dated Oct. 2, 2023 for European Patent Application No. 23169423.3.

*Primary Examiner* — Carol W Chan
(74) *Attorney, Agent, or Firm* — Volpe Koenig

(57) ABSTRACT

A method for classifying a detected object is disclosed. First and second object detectors detect first and second objects in first and second image frames, respectively, of a video sequence, and first and second probability scores respectively are calculated indicating a probability that the detected object belongs to a specific class. The second image frame is subsequent to the first image frame. The first object detector has a higher object detection precision and a longer processing time than the second object detector. The first and second object detections are performed in parallel. Reducing the first classification threshold or increasing the first probability score are performed if the first probability score is below a first classification threshold and the second probability score is above a second classification threshold. The first object is determined to belong to the specific class based on the probability scores and the classification thresholds.

15 Claims, 5 Drawing Sheets

(58) Field of Classification Search
CPC ........... G06T 7/223; G06T 2207/10016; G06T 3/4038; G06F 18/2411; G06N 20/00
See application file for complete search history.

(56) References Cited

U.S. PATENT DOCUMENTS

| | | |
|---|---|---|
| 2018/0089505 A1 | 3/2018 | El-Khamy et al. |
| 2019/0034734 A1 | 1/2019 | Yen et al. |
| 2019/0164010 A1 | 5/2019 | Ma et al. |
| 2020/0026934 A1* | 1/2020 | Yokota .................... G06T 7/174 |
| 2020/0057450 A1* | 2/2020 | Calleija .................. G06V 10/98 |
| 2020/0394797 A1 | 12/2020 | Sakai et al. |
| 2021/0110138 A1* | 4/2021 | Su ......................... G06V 10/764 |
| 2023/0410352 A1* | 12/2023 | Hassbring ............. G06T 3/4053 |

\* cited by examiner

METHOD AND DEVICE FOR DETERMINING THAT A DETECTED OBJECT BELONGS TO A SPECIFIC CLASS

TECHNICAL FIELD

The present invention relates to object detection, and specifically to determining that a detected object belongs to a specific class.

BACKGROUND

Object detection using an object detector, e.g., using a machine learning model which may or may not be based on a neural network, in an image frame of a video sequence includes identification of where in the image frame an object is located and determining that the detected object belongs to a class of objects. In some scenarios, it is desired to detect objects of a specific class fast and in each image frame of the video sequence in which at least a portion of one such object is visible. One such scenario is for example a scenario in which objects belonging to the specific class should be masked in each image frame. However, it may be difficult to determine that a detected object in an image frame belongs to a specific class when a part of the object is occluded in the image frame, such as an image frame in which the object has only partly entered the scene captured in the image frame or an image frame in which the object is temporarily partially occluded in the scene captured in the image frame. One solution is to enhance the object detector used, e.g., by enabling the object detector to determine that a detected object in an image frame belongs to a specific class even when a portion of the object is occluded in the image frame. However, this may not be possible and if it is, it will increase the processing time required by the enhanced object detector to perform such determining and increase processing time is detrimental in scenarios where fast object detection is desired. Furthermore, it should be noted that even without enhancement, object detectors may have a processing time per image frame such that fewer image frames per time unit can be processed than the number of images per time unit according to a frame rate of the video sequence. Hence, further increased processing time for the object detectors is undesired.

Consequently, there is still a need for improvements in determining that a detected object belongs to a specific class.

SUMMARY OF THE INVENTION

An object of the present invention is to overcome or at least mitigate the problems and drawbacks of prior art.

According to a first aspect, a method for determining that a detected object belongs to a specific class is provided. The method comprises performing first object detection using a first object detector. The first object detection comprises detecting an object in a first image frame of a video sequence, and determining a first probability score indicating a probability that the detected object in the first image frame belongs to a specific class. The method further comprises performing second object detection using a second object detector. The second object detection comprises detecting an object in a second image frame of the video sequence, and determining a second probability score indicating a probability that the detected object in the second image frame belongs to the specific class, wherein the second image frame is subsequent to the first image frame in the video sequence. The first object detector has a higher object detection precision as compared to the second object detector, and the first object detector requires a first processing time for performing the first object detection, the first processing time being longer as compared to a second processing time required by the second object detector for performing the second object detection. The second object detection is performed in parallel with the first object detection. The method further comprises performing one or more of reducing the first classification threshold and increasing the first probability score on condition that the determined first probability score is below a first classification threshold and the determined second probability score is above a second classification threshold. The method further comprises the first object detector determining that the detected object in the first image frame belongs to the specific class on condition that the increased first probability score is above the first classification threshold, the first probability score is above the reduced first classification threshold, or the increased first probability score is above the reduced first classification threshold.

The invention makes use of a realization that a second object detector can be introduced to perform a second object detection, wherein the second object detector requires a second processing time for performing the second object detection, the second processing time being shorter as compared to a first processing time required by a first object detector for performing a first object detection. By this, the second object detector may perform the second object detection in the second image frame before the first object detector finalizes the first object detection in the first image frame and hence, the first object detector can take into account the result of the second object detection. As the second image frame is subsequent to the first image frame, any object being partially occluded in the first image frame may be completely visible or at least less occluded in the second image frame. Hence, the result of the second object detection may be more conclusive regarding the probability of the object belonging to the specific class even if the second object detector would be worse at object detection than the first object detector for the same image frame.

By including the second object detector that has a second processing time shorter than the first processing time of the first object detector, the second object detection can be finalized for the second image frame subsequent to the first image frame before the first object detection in the first image frame is finalized and the results from the second object detection can be used to enhance the results from the first object detection. Hence, determining that an object belongs to a particular class can be made by the first object detector also in cases where the first object detector on its own would not determine that a detected object belongs to the specific class.

It is to be noted, that even if the method of the first aspect may result in an increased number of false determining that a detected object belongs to the specific class by the first object detector, this may be acceptable since it will also result in a reduced number of times when the first object detector does not determine that a detected object belongs to the specific class even if it actually does.

In embodiments, in the first object detection, the object is detected in a first region in the first image frame, and, in the second object detection, the object is detected in a second region in the second image frame. Performing one or more of reducing the first classification threshold and increasing the first probability score is then further conditioned on a distance from the second region to the first region being below a distance threshold.

By introducing this further condition, the number of false determining that a detected object belongs to the specific class by the first object detector may be reduced. Specifically, if the detected object in the second image frame is located longer than the distance threshold away from the detected object in the first image frame it may not be likely that the detections relate to the same object and hence, the reducing the first classification threshold and increasing the first probability score should not be performed since the result from the second object detector is not likely to be relevant in relation to the detection by the first object detector.

The distance threshold may increase with increased distance in time between the first image frame and the second image frame in the video sequence. This is beneficial if the detected object is expected to move at certain velocity such that the distance between the second region and the first region will depend on the time between the first image frame and the second image frame, i.e., the time between the capturing of the first image frame and the capturing of the second image frame. The increase of the distance threshold may depend on the specific object class. This is beneficial since objects of different classes, such as person and car, will move at different expected velocities. Additionally, or alternatively, the method may then further comprise obtaining a velocity of the detected object in the first image frame, wherein the increase of the distance threshold depends on the obtained velocity. By obtaining the velocity, the expected distance between from the second region to the first region being can be estimated and the distance threshold can be set based on that estimated distance, e.g., to the estimated distance or to a given percentage higher than the estimated distance to encompass any errors in and change in relation to the obtained velocity.

The method may further comprise performing third object detection, using the second object detector. The third object detection comprises detecting an object in a third image frame of the video sequence, and determining a third probability score indicating a probability that the detected object in the third image frame belongs to the specific class, wherein the third image frame is subsequent to the first image frame in the video sequence. The first processing time is longer as compared to the second processing time added with a third processing time required by the second object detector for performing the third object detection. The third object detection is performed in sequence with the second object detection and in parallel with the first object detection. Performing one or more of reducing the first classification threshold and increasing the first probability score is then further conditioned on the determined third probability score being above the second classification threshold.

On condition that the second object detector can perform object detection in both the second image frames and a third image frame in less time than the first object detector can perform object detection in the first image frame, it is beneficial to the results of object detections by the second in both the second image frame and the third image frame to adapt the object detection by the first object detection in the first image frame. Specifically, if either of the second probability score and the third probability score is below the second classification threshold, the results from the second object detector are inconclusive and hence, only if both the second probability score and the third probability score are above the second classification threshold, the object detection of the first object detector is adapted by means of performing one or more of reducing the first classification threshold and increasing the first probability score.

The method may further comprise masking, using the first object detector, the detected object determined to belong to the specific class in the first image frame.

Masking as envisaged herein may e.g., covering an object with a solid/opaque colour or semi-transparent colour, include applying a motion blur to an object such that the object can no longer easily be identified, and/or, e.g. a forced pixelation and/or obfuscation of an object in the output image stream such that the object can no longer easily be identified, or similar. In other envisaged embodiments, masking may include making the objects themselves completely or partially transparent, such that the background is visible through the objects. This may be possible if e.g., an image frame of the background without the object(s) in front is available (from e.g., an earlier image frame).

By enabling the first object detector to determine that a detected object belongs to a particular class also in cases where the first object detector on its own would not determine that the detected object belongs to the specific class and hence would not be masked, such detected objects determined to belong to the particular class are masked in the first image frame.

According to a second aspect, a non-transitory computer-readable storage medium is provided having stored thereon instructions for implementing the method according to the first aspect or a method according to the second aspect, when executed in a device having a processor.

The above-mentioned optional additional features of the method according to the first aspect, when applicable, apply to the non-transitory computer-readable storage medium according to the second aspect as well. In order to avoid undue repetition, reference is made to the above.

According to a third aspect, a device for determining that a detected object belongs to a specific class is provided. The device comprises a first object detector configured to perform first object detection, a second object detector configured to perform second object detection, and a circuitry configured to execute a changing function. The first object detection comprises detecting an object in a first image frame of a video sequence, and determining a first probability score indicating a probability that the detected object in the first image frame belongs to the specific class. The second object detection comprises detecting an object in a second image frame of the video sequence, and determining a second probability score indicating a probability that the detected object in the second image frame belongs to the specific class, wherein the second image frame is subsequent to the first image frame in the video sequence. The first object detector has a higher object detection precision as compared to the second object detector, and the first object detector requires a first processing time for performing the first object detection, the first processing time being longer as compared to a second processing time required by the second object detector for performing the second object detection. The second object detection is performed in parallel with the first object detection. The changing function is configured to, on condition that the determined first probability score is below a first classification threshold and the determined second probability score is above a second classification threshold, perform one or more of reducing the first classification threshold and increasing the first probability score. The first object detector is further configured to, on condition that the increased first probability score is above the first classification threshold, the first probability score is above the reduced first classification threshold, or the increased first probability score is above the reduced first classification threshold, determine that the detected object in the first image frame belongs to the specific class.

The above-mentioned optional additional features of the method according to the first aspect, when applicable, apply to the device according to the fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable to scenarios where it is desired that objects of a specific class are detected in each image frame of the video sequence in which at least a portion of one such object is visible. One such scenario is for example a scenario in which objects belonging to the specific class should be masked in each image frame. Other examples are scenarios in which a number of objects belonging to the specific class should be counted, in which an alarm should be triggered when an object belonging to the specific class is detected, in which it should be identified when an object belonging to the specific class is located in a scene for more than a predetermined period of time, etc. The objects of the specific class should be detected also in image frames when this is difficult for the first object detector, e.g., in image frames in which a part of the object is occluded in the image frame, such as an image frame in which the object has only partly entered the scene captured in the image frame or an image frame in which the object is temporarily partially occluded in the scene captured in the image frame. Other situations in which it is difficult for the first object detector to detect objects of the specific class is when lighting conditions changes between image frames and when a reflection in a window become stronger.

The invention is further applicable to scenarios where object detection is to be performed in real time, e.g., in a scenario where object detection is to be made in image frames of a video sequence and masking is to be performed in real time on detected objects in the video sequence before play back of the video sequence.

The invention is particularly advantageous in scenarios where a first object detector has a processing time for process an image frame that is longer than the time between image frames of the video sequence according to a frame rate of the video sequence.

Figure 1:
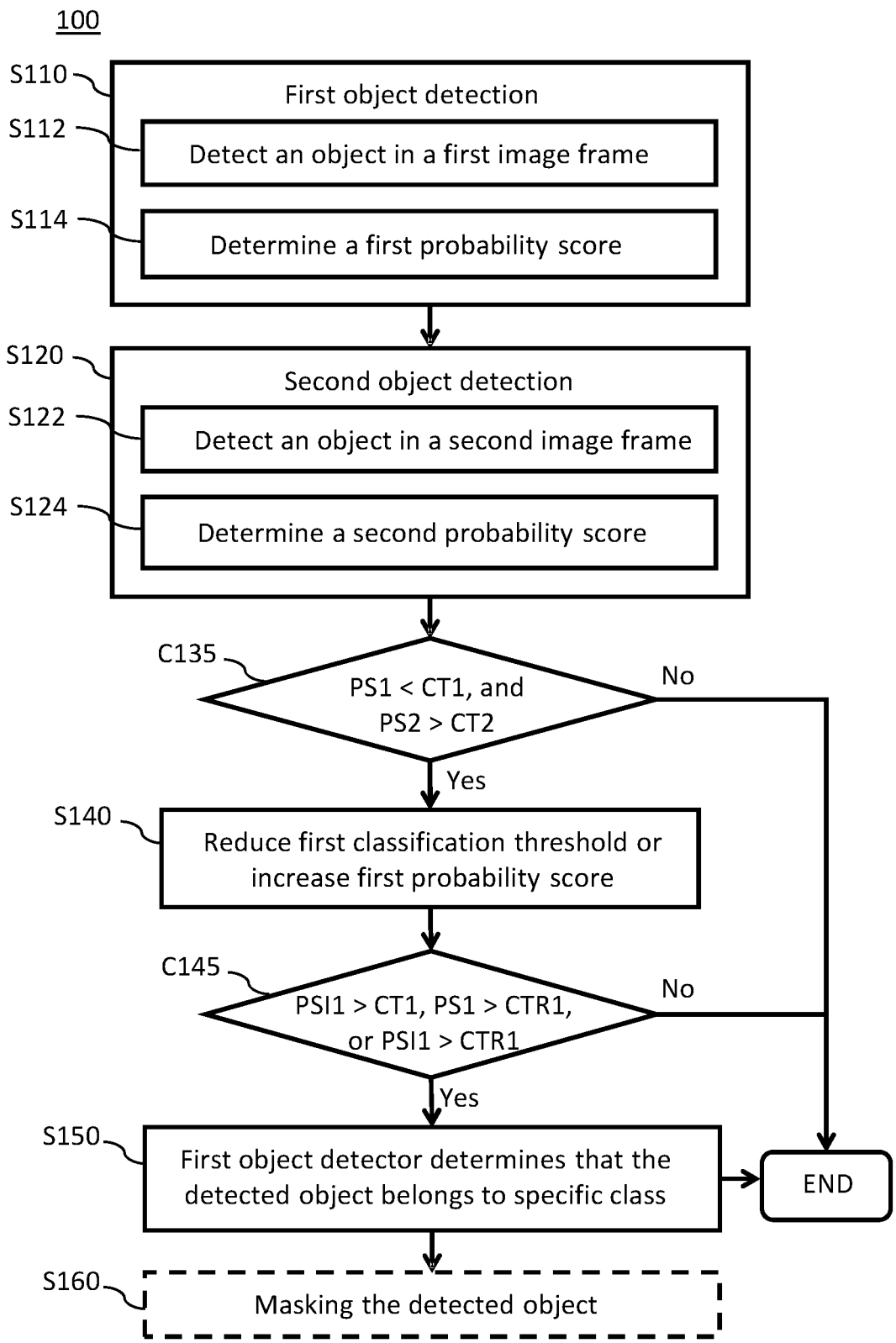
FIG. 1 shows a flow chart in relation to embodiments of a method of determining that a detected object belongs to a specific class.

Embodiments of a method 100 of determining that a detected object belongs to a specific class will now be described in relation to the flow chart in FIG. 1 and the illustrated six image frames in FIGS. 2A-2F.

The method 100 comprises performing first object detection S110 using a first object detector. The first object detector may for example be an object detector using any suitable machine learning model. Such machine learning models may be based on neural networks. For example, convolutional neural networks are well known and object detectors using such provide a class to which a detected object belongs and a bounding box as a result. In alternative instance segmentation or panoptic segmentation which relate to a mask instead of a bounding box. It should be noted that this mask received from an object detector using segmentation is different from a mask intended to obscure or otherwise anonymize the object. It is rather a mask indicating which pixels relate to the detected object. From the segmentation a probability is received for each pixel of whether the object belongs to the specific class. Each pixel from the segmentation may relate to a corresponding pixel in the image frame or it may relate to corresponding a corresponding block of pixels, i.e., two or more adjacent pixels, in the image frame. In the latter case, a reduction of resolution is made in the segmentation. In alternative, machine learning models that are not based on neural networks may be used, such as a Viola-Jones object detection framework.

The first object detection S110 comprises detecting S112 an object in a first image frame of a video sequence, and determining S114 a first probability score indicating a probability that the detected object in the first image frame belongs to a specific class. Detecting S112 may include identification of a location of the detected object in the first image frame and the location may be indicated by a bounding box which is a box (preferably minimal) that encloses the detected object in the first image frame. The first probability score may for example be a value between zero ('0') and one ('1') or a percentage value between zero percent ('0%') and one hundred percent ('100%'). The first object detection S110 may also include determining one or more further probability scores indicating respective probabilities that the detected object in the first image frame belongs to other classes than the specific class.

The method further comprises performing second object detection S120 using a second object detector. The second object detector may be any of the types described in relation to the first object detector but which is adapted to have a shorter processing time and typically a lower detection precision. The second object detector may further be specialized, e.g. in detecting objects of the specific class, in analysing the infrared spectrum, etc.

The second object detection comprises detecting S122 an object in a second image frame of the video sequence, and determining S124 a second probability score indicating a probability that the detected object in the second image frame belongs to the specific class, wherein the second image frame is subsequent to the first image frame in the video sequence. Detecting S122 may include identification of a location of the detected object in the second image frame and the location may be indicated by a bounding box which is a box (preferably minimal) that encloses the detected object in the second image frame. The second probability score may for example be a value between zero ('0') and one ('1') or a percentage value between zero percent ('0%') and one hundred percent ('100%'). The second object detection S120 may also include determining one or more further probability scores indicating respective probabilities that the detected object in the second image frame belongs to other classes than the specific class.

The first object detector has a higher object detection precision as compared to the second object detector. Furthermore, the first object detector requires a first processing time for performing the first object detection, the first processing time being longer as compared to a second processing time required by the second object detector for performing the second object detection. The higher object detection precision and longer processing time of the first object detector are typically related since achieving a higher precision typically requires a longer processing time. The second object detector is introduced to enable performing the second object detection in the second image frame in a shorter time than the first processing time of the first object detector. Hence, the object detection precision is permitted to be lower for the second object detector in order to achieve a shorter processing time for the second object detector.

The second object detection S120 is performed in parallel with the first object detection S110. However, as the second processing time required by the second object detector for performing the second object detection S120 is shorter than the first processing time required by the first object detector for performing the first object detection S110, if the first object detection S110 and the second object detection S120 starts at the same time, part of the first object detection S110 will be performed after the second object detection S120 is finished.

On condition C135 that the determined first probability score is below a first classification threshold (PS1<CT1) and the determined second probability score is above a second classification threshold (PS2>CT2) one or both of the actions of reducing S140 the first classification threshold to a reduced first classification threshold and increasing the first probability score to an increased first probability score (PSI1) is performed. Both these actions will make the first object detector more prone to determine that the detected object belongs to the specific class.

The increase of the first probability score and/or the decrease of the first classification threshold may be by a fixed value. In alternative, the increase of the first probability score and/or the decrease of the first classification threshold may be by a value depending on how much the determined second probability score is above the second classification threshold. For example, the increase of the first probability score and/or the decrease of the first classification threshold may be the same as the difference between the determined second probability score and the second classification threshold. In alternative, it may be a percentage of the difference between the determined second probability score and the second classification threshold. Typically, only one of increasing the first probability score and decreasing the first classification threshold is performed. If both of increasing the first probability score and decreasing the first classification threshold is performed, the value increase and decrease, respectively, may be half of what the increase or decrease would have been if only one of increasing the first probability score and decreasing the first classification threshold is performed.

The first classification threshold is typically the threshold on the first probability score above which the first object detector to determine that the detected object belongs to the specific class even without taking into account the result from the second object detection performed by the second object detector in for the second image frame. Preferably, neither of the actions is performed if the determined first probability score is above the first classification threshold.

The second classification threshold is typically the threshold on the second probability score below which the second object detector determines that the detected object does not belong to the specific class. Preferably, neither of the actions is performed if the determined second probability score is (equal to or) below the second classification threshold.

On condition C145 that the increased first probability score is above the first classification threshold (PSI1>CT1), the first probability score is above the reduced first classification threshold (PS1>CTR1), or the increased first probability score is above the reduced first classification threshold (PSI1>CTR1), the first object detector determines S150 that the detected object in the first image frame belongs to the specific class.

In a scenario where the detected object is partially occluded in the first image frame and fully visible or at least less occluded in the second image frame, the second probability score determined by the second object detector may be higher than the second classification threshold which means that the detected object in the second image frame is determined by the second object detector to belong to the specific class. This classification by the second object detector is then be used to make the first object detector more prone to determine the detected object in the first image frame to belong to the specific class, by increasing the first probability score to an increased first probability score or by reducing the first classification threshold to a reduced first classification threshold.

The first and second object detectors may be any object detectors that can detect an object and determine a probability score indicating a probability that the detected object in the first image frame belongs to a specific class. Preferably, the first and second object detectors should further also be able to identify a location of the detected object. One or both of the first and second object detectors may be implemented in software or hardware as described further hereinbelow in relation to FIG. 3.

The location of the detected object in the first image frame and in the second image frame, respectively, may be determined. Performing S140 one or both of the actions of reducing the first classification threshold and increasing the first probability score may then be further conditioned on a distance from the second region to the first region being below a distance threshold. If the detected object in the second image frame is located longer than the distance threshold away from the detected object in the first image frame, it may not be likely that the detections relate to the same object. Hence, neither of the two actions should be performed, since the result from the second object detector is then not likely to be relevant in relation to the detection by the first object detector.

The distance threshold may increase with increased distance in time between the first image frame and the second image frame in the video sequence. For a detected object that moves at certain velocity, the distance from the second region to the first region will depend on the time between the capturing of the first image frame and the capturing of the second image frame. The increase of the distance threshold may depend on the specific object class since objects of different classes, such as person and car, will move at different expected velocities. If a velocity of the detected object is obtained in the first image frame, the increase of the distance threshold may depend on the obtained velocity. By obtaining the velocity, the expected distance between from the second region to the first region can be estimated and the distance threshold can be set based on that estimated distance, e.g., to the estimated distance or to a given percentage higher than the estimated distance to encompass any errors in and change in relation to the obtained velocity. The velocity may be obtained by means of an external sensor, such as RADAR or LIDAR, or by means of data from a tracker if the detected object has been successfully tracked in previous frames to the first and second image frames.

The method may further comprise performing third object detection, using the second object detector. The third object detection comprises detecting an object in a third image frame of the video sequence, and determining a third probability score indicating a probability that the detected object in the third image frame belongs to the specific class, wherein the third image frame is subsequent to the first image frame in the video sequence. In this embodiment, the first processing time is longer as compared to the second processing time added with a third processing time required by the second object detector for performing the third object detection. The third object detection is performed in sequence with the second object detection and in parallel with the first object detection. Hence, the second and third object detection may be performed by the second object detector before the first object detector is finished with the first object detection and the result from both the second and third object detection can be used in the first object detection. Specifically, performing one or more of reducing the first classification threshold and increasing the first probability score is then further conditioned on the determined third probability score being above the second classification threshold.

The method 100 may further comprise masking S160, using the first object detector, the detected object determined to belong to the specific class in the first image frame.

In some embodiments, the first processing time of the first object detector is longer than the time between image frames of the video sequence according to a frame rate of the video sequence. In such embodiments, if object detection should be performed by the first object detector in real time, the first object detector can only perform object detection in a subset of the image frames of the video sequence. If for example, the first processing time of the first object detector is six times the time for each image frame of the video sequence according to the frame rate of the video sequence, the first object detector can only perform object detection in each sixth video frame if the object detection should be performed in real time. In such embodiments, the second object detector may then have a processing time for performing object detection in one image frame such that it may perform object detection in five image frames in less time than the first processing time of the first object detector. In such a case, for each set of six consecutive image frames, the first object detector will perform first object detection in the first video frame and this object detection will use the result of the second object detector performing object detection in the five last image frames in parallel with the first object detection performed in the first image frame by the first object detector.

Turning now to FIGS. 2A-2F, which show illustrations of six image frames 201-206, wherein an object in the form of a car 210 is temporarily occluded by a building 220 to different extent in the first three image frames 201-203 and fully visible in the last three image frames 204-206. An embodiment of the method 100 will now be described where the first processing time of the first object detector is six times the time for each image frame of the video sequence according to the frame rate of the video sequence and the second object detector has a processing time for performing object detection in one image frame such that it may perform object detection in five image frames in less time than the first processing time of the first object detector. Specifically, the first object detector will perform first object detection in the first video frame 201 and this object detection will use the result of the second object detector performing object detection in the five last image frames 202-206 in parallel with the first object detection in the first image frame 201 performed by the first object detector. In some embodiments, the second object detector may also perform object detection in the first image frame 201. This may be specifically beneficial when the second object detector is specialized, such as when the second object detector may analyse the infrared spectrum and, hence, may be better when it is dark. If the second object detector has a processing time for performing object detection in one image frame such that it may perform object detection in six image frames in less time than the first processing time of the first object detector, the second object detector may then perform object detection in all six image frames 201-206.

Figure 2A:
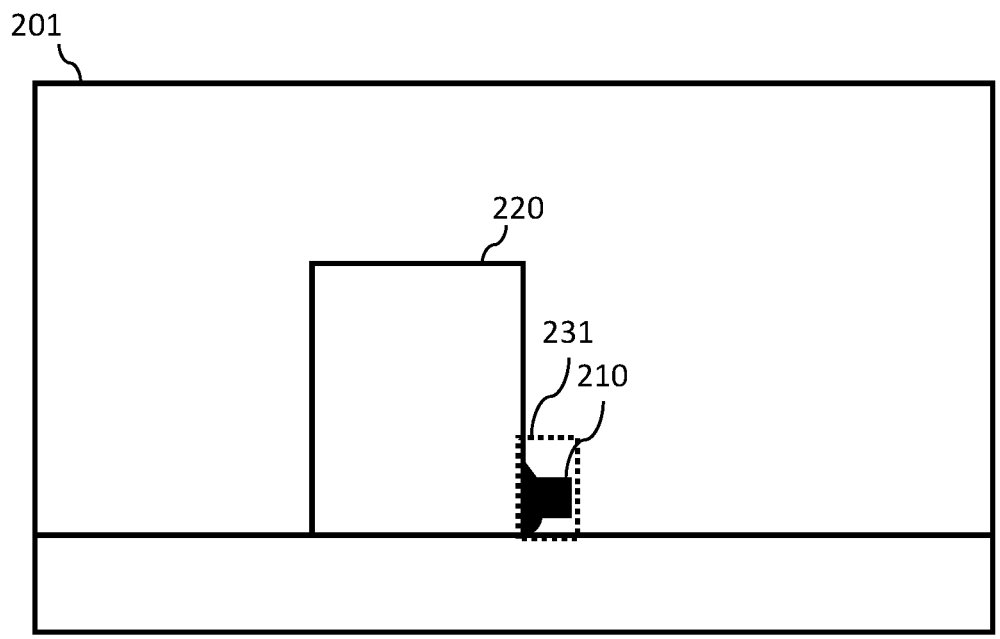
FIGS. 2A-2F show illustrations of six image frames, wherein a car is temporarily occluded by a building to different extent in the first three image frames and fully visible in the last three image frames.

In FIG. 2A, the first image frame 201 is shown where the car 210 is partially occluded by the building 220. This is a first image frame where a portion of the car 210 is visible after previous image frames in which the car 210 was completely occluded by the building 220. The first object detector performs first object detection in the first image frame 201. The object 210 is detected by the first object detector. A first probability score indicating a probability that the object 201 belongs to the class 'car' is then determined by the first object detector.

Figure 2B:
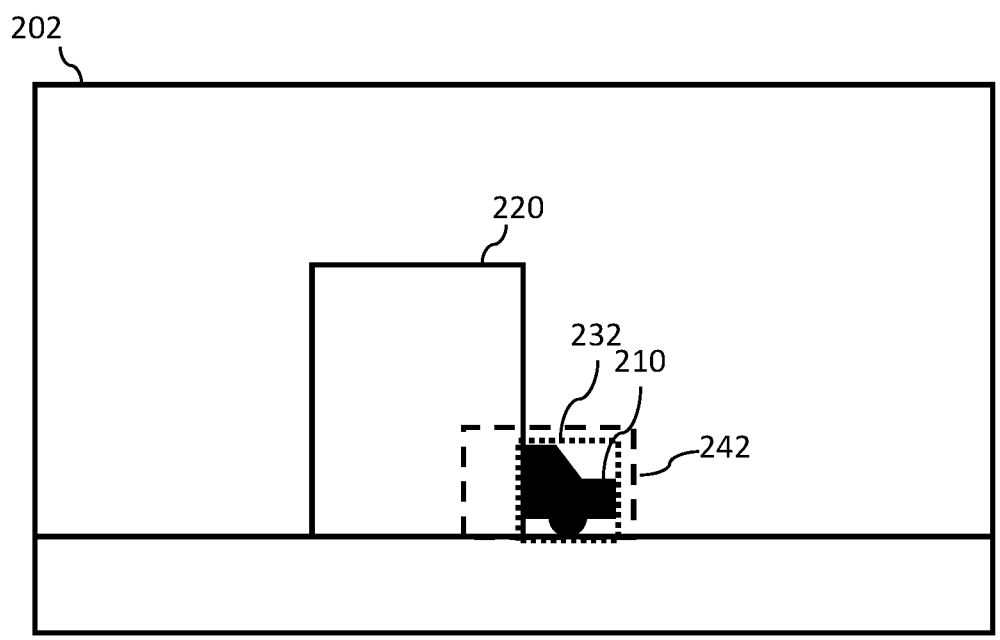

In FIG. 2B, the second image frame 202 is shown where the car 210 has moved in relation to its position in the first image frame 201 such that a smaller portion of the car 210 is occluded by the building 220. The second object detector performs second object detection in the second image frame 202 parallel to the first object detector performing first object detection in the first image frame 201. The object 210 is detected by the second object detector and a second probability score indicating a probability that the object 210 belongs to the class 'car' is then determined by the second object detector.

Figure 2C:
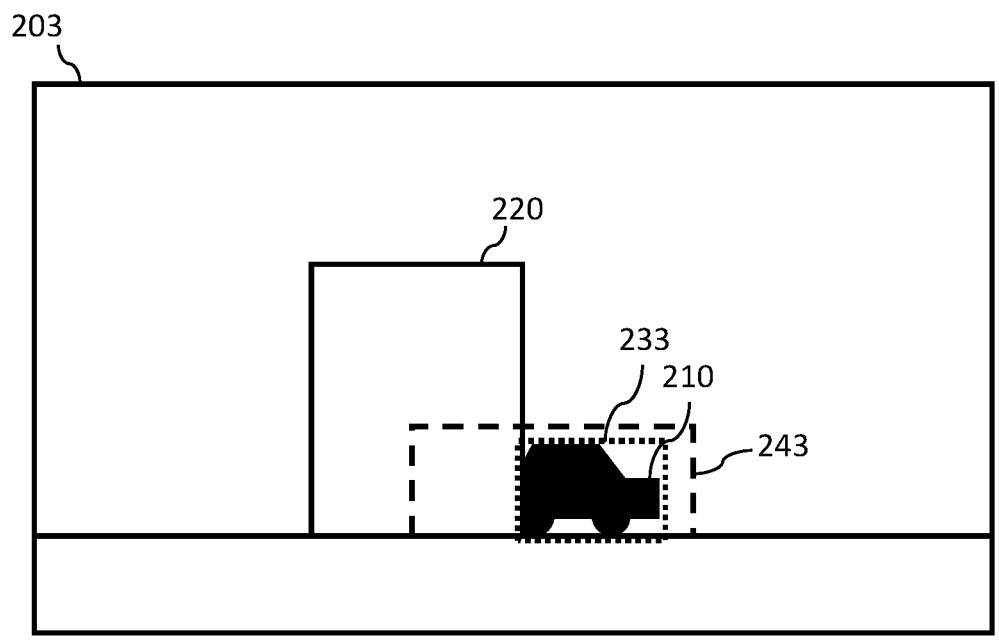

In FIG. 2C, the third image frame 203 is shown where the car 210 has moved in relation to the second image frame 202 such that an even smaller portion of the car 210 is occluded by the building 220. The second object detector performs third object detection in the third image frame 203 subsequent to performing second object detection in the second image frame 202 and parallel to the first object detector performing first object detection in the first image frame 201. The object 210 is detected by the second object detector and a third probability score indicating a probability that the object 210 belongs to the class 'car' is then determined by the second object detector.

Figure 2D:
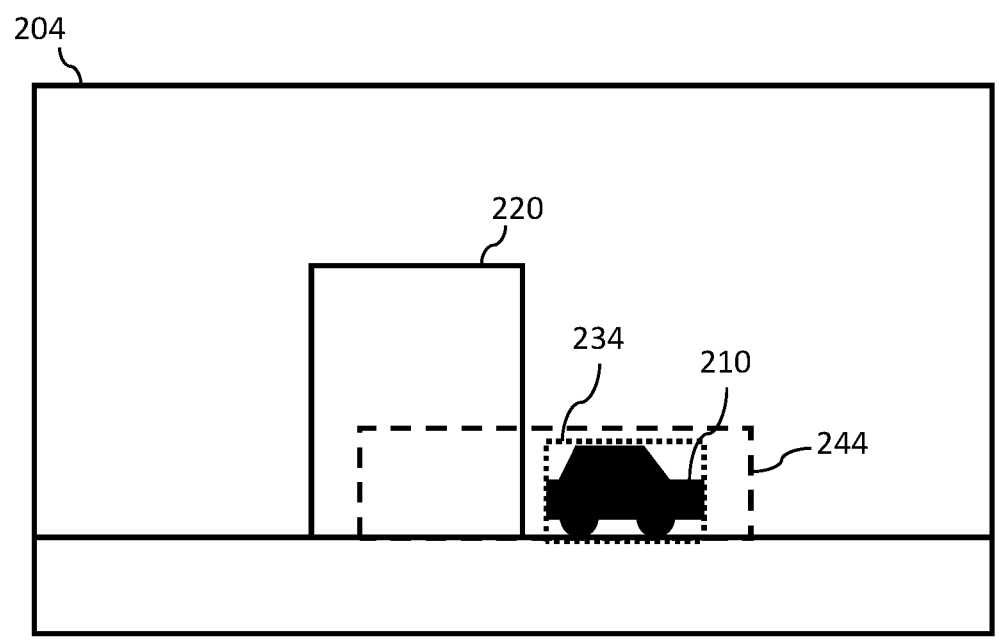

In FIG. 2D, the fourth image frame 204 is shown where the car 210 has moved in relation to the third image frame 203 such that the car 210 is fully visible. The second object detector performs fourth object detection in the fourth image frame 204 subsequent to performing third object detection in the third image frame 203 and parallel to the first object detector performing first object detection in the first image frame 201. The object 210 is detected by the second object detector and a fourth probability score indicating a probability that the object 210 belongs to the class 'car' is then determined by the second object detector.

Figure 2E:
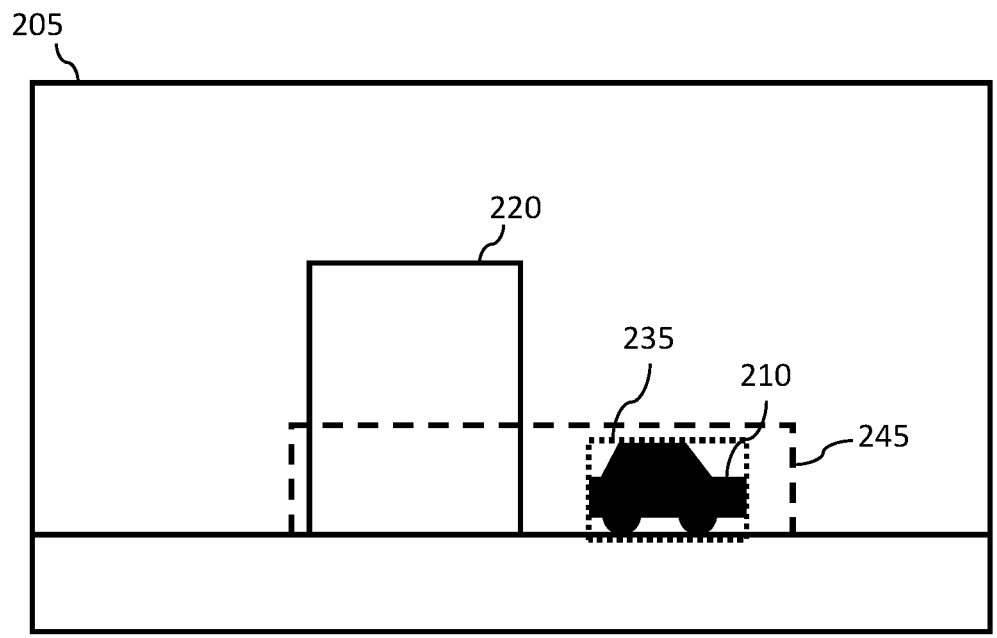

In FIG. 2E, the fifth image frame 205 is shown where the car 210 has moved in relation to the fourth image frame 204. The second object detector performs fifth object detection in the fifth image frame 205 subsequent to performing fourth object detection in the fourth image frame 204 and parallel to the first object detector performing first object detection in the first image frame 201. The object 210 is detected by the second object detector and a fifth probability score indicating a probability that the object 210 belongs to the class 'car' is then determined by the second object detector.

Figure 2F:
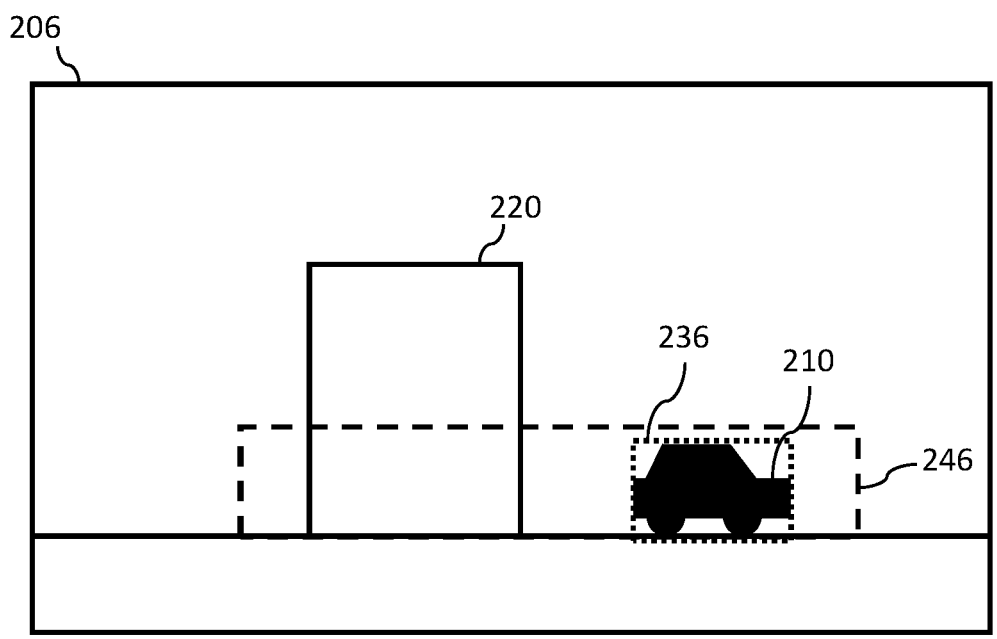

In FIG. 2F, the sixth image frame 206 is shown where the car 210 has moved in relation to the fifth image frame 205. The second object detector performs sixth object detection in the sixth image frame 206 subsequent to performing fifth object detection in the fifth image frame 205 and parallel to the first object detector performing first object detection in the first image frame 201. The object 210 is detected by the second object detector and a sixth probability score indicating a probability that the object 210 belongs to the class 'car' is then determined by the second object detector.

On condition that the determined first probability score is below the first classification threshold and the determined second to sixth probability scores are all above the second classification threshold, one or more of reducing the first classification threshold and increasing the first probability score is performed.

Then, on condition that the increased first probability score is above the first classification threshold, the first probability score is above the reduced first classification threshold, or the increased first probability score is above the reduced first classification threshold, the first object detector determines that the detected object in the first image frame belongs to the specific class 'car'. The object 210 may then be masked in the first image frame.

In a first example, the first classification threshold and the second classification threshold are both 70%. Furthermore, the first probability score is 63%, the second probability score is 72%, the third probability score is 89%, the fourth probability score is 98%, the fifth probability score is 98%, and the sixth probability score is 98%, this means that the determined first probability score is below the first classification threshold and the determined second to sixth probability scores are all above the second classification threshold, In a first alternative, the first classification threshold may then be reduced, e.g. by 10% to 60%. In a second alternative, the first probability score may be increased, e.g. by 10% to 73%. In a third alternative, the first classification threshold may be reduced, e.g. by 5% to 65, and the first probability score may be increased, e.g. by 5% to 68%. In all these three alternatives, the respective condition that the increased first probability score is above the first classification threshold, the first probability score is above the reduced first classification threshold, or the increased first probability score is above the reduced first classification threshold, are fulfilled. Hence, the first object detector determines that the detected object in the first image frame belongs to the specific class 'car' and the object 210 may then be masked in the first image frame. If one of the second to sixth probability scores would not have been above the second classification threshold, the condition that the determined second to sixth probability scores should all be above the second classification threshold would not have been fulfilled. In such a case, it may be decided not to perform one or more of reducing the first classification threshold and increasing the first probability score. In alternative, if each of the other four of the second to sixth probability scores would have been above the second classification threshold, it may be decided to perform one or more of reducing the first classification threshold and increasing the first probability score since the condition is fulfilled for a majority of the second to sixth image frames 202-206.

In a second example, the first classification threshold, and the first to sixth probability scores are the same as in the first example, but the second classification threshold is 80%. Hence, the second probability score of 72% is below the second classification threshold of 80%. Hence, if all of the second to sixth probability scores need to fulfil the condition to be above the second classification threshold to perform one or more of reducing the first classification threshold and increasing the first probability score, this would not be performed in the second example. In alternative, if it is sufficient that a majority of the second to sixth probability scores fulfil the condition of being above the second classification threshold, it will be decided in the second example to perform one or more of reducing the first classification threshold and increasing the first probability score since the condition is fulfilled by the third to sixth probability scores.

Other alternatives are envisaged depending on the condition being fulfilled for some of the second to sixth probability scores. For example, the decision may be based on an average of the second to sixth probability scores such that the condition is considered to be fulfilled if the average is above the second classification threshold. As another example, the decision may be based on a median of the second to sixth probability scores such that the condition is considered to be fulfilled if the median is above the second classification threshold. As a further example, the decision may be based on both the average and the median of the second to sixth probability scores such that the condition is considered to be fulfilled if both the average and the median is above the second classification threshold. As a further example, the decision may be based on a maximum of the second to sixth probability scores such that the condition is considered to be fulfilled if the maximum is higher by a certain amount than the second classification threshold, i.e. that the second object detector has a very high probability score in one of the second to sixth images. As a further example, the decision may be based on a minimum of the second to sixth probability scores such that the condition is considered not to be fulfilled if the minimum is lower by a certain amount than the second classification threshold, i.e. that the second object detector has a very low probability score in one of the second to sixth images.

In a third example, the first classification threshold, and the first to sixth probability scores are the same as in the first example, but the second classification threshold is 90%.

Hence, the second probability score of 72% is below the second classification threshold of 80%. Hence, if all of the second to sixth probability scores need to fulfil the condition to be above the second classification threshold to perform one or more of reducing the first classification threshold and increasing the first probability score, this would not be performed in the third example. In alternative, if it is sufficient that an average of the second to sixth probability scores fulfil the condition of being above the second classification threshold, it will be decided in the third example to perform one or more of reducing the first classification threshold and increasing the first probability score since (72%+89%+98%+98%+98%)/5=91%.

The first object detector detects the object 210 in a first region indicated in FIG. 2A by the dotted box 231 and the second detector detects the object 210 in a second to sixth region indicated by the dotted boxes 232-236, respectively. Performing one or more of reducing the first classification threshold and increasing the first probability score may be further conditioned on a distance from each of the second to sixth regions 232-236 to the first region 231 being below a distance threshold. The distance threshold increases with increased distance in time from the first image frame 201, such that it increases over the second to the sixth image frames 202-206 and the increase depends on the fact that the specific object class is 'car' such that the increase corresponds to an expected velocity of a car. Typically, the increase is based on a maximum expected velocity of a car. The increasing distance threshold is indicated in FIGS. 2B-2F by the dashed boxes 242-246, respectively. As can be seen in FIGS. 2B-2F, the second to sixth regions indicated by the dotted boxes 232-236 are all located within the distance thresholds indicated by the dashed boxes 242-246. Hence, in this example, the further condition that the distance from each of the second to sixth regions 232-236 to the first region 231 should be below the distance threshold is fulfilled.

If the object 230 would not have been detected by the second object detector in one of the second to sixth image frames 202-203 but another object (not shown) would have been detected instead and determined to belong to the class 'car' in a different region (not shown) outside the distance threshold indicated by the respective dashed box 242-246, the further condition that the distance from each of the second to sixth regions 232-236 to the first region 231 should be below the distance threshold would not have been fulfilled. In such a case, it may be decided not to perform one or more of reducing the first classification threshold and increasing the first probability score. In alternative, if the object 230 is detected by the second object detector in each of the other four of the second to sixth image frames 203-206 and the further condition that the distance from each of the corresponding regions of the second to sixth regions 233-236 to the first region 231 should be below the distance threshold is fulfilled, it may be decided to perform one or more of reducing the first classification threshold and increasing the first probability score since the further condition is fulfilled for a majority of the second to sixth image frames 202-206. Other alternatives are envisaged depending on the further condition being fulfilled for some of the second to sixth image frames 202-203 but not for other.

The method 100 has been described in relation to one detected object and one specific class. However, the method 100 is applicable also in scenarios where there are two or more objects in each image frame. The method 100 is applicable also in scenarios where it should be determining that a detected object belongs to one of two or more specific classes.

Figure 3:
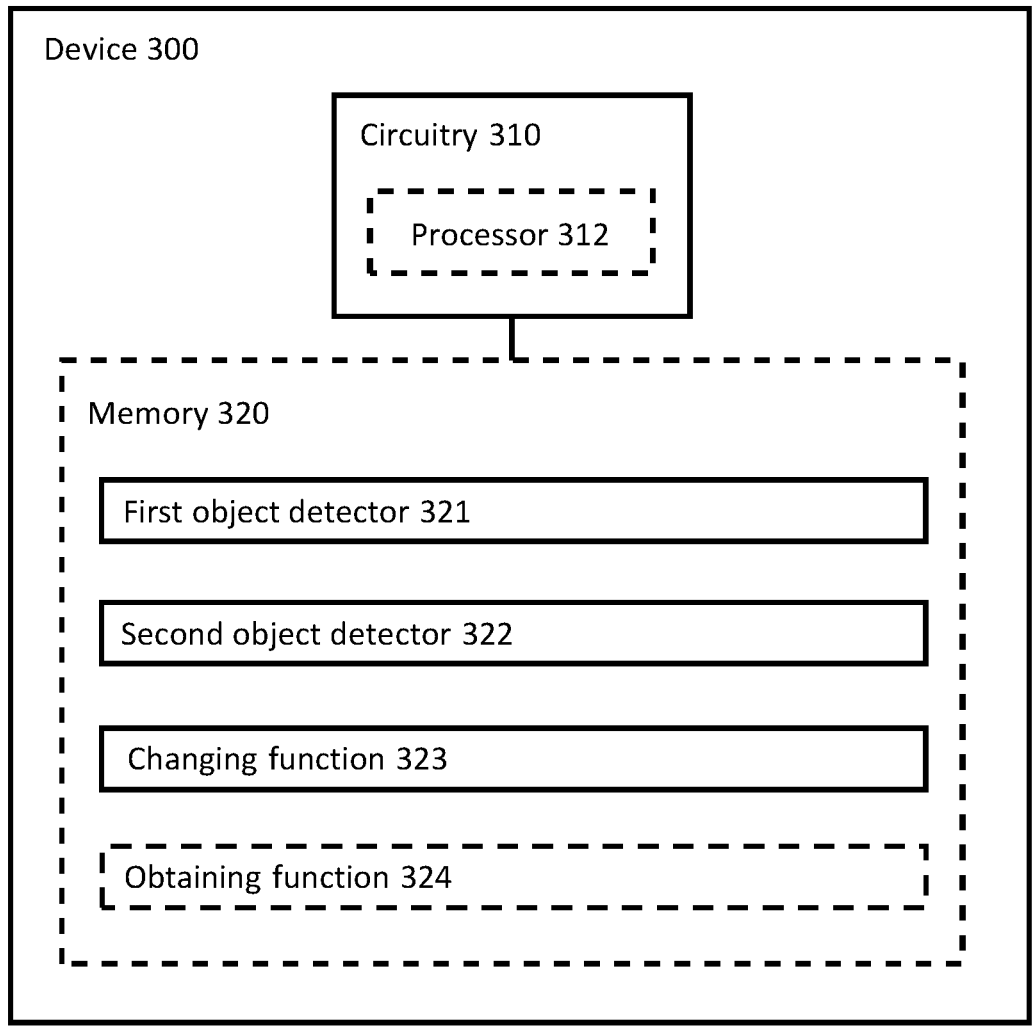
FIG. 3 shows a schematic diagram in relation to embodiments of a device for determining that a detected object belongs to a specific class.

FIG. 3 shows a block diagram in relation to embodiments of a device 300 for determining that a detected object belongs to a specific class. The device 300 may for example be a camera, be included in a camera or be connected to a camera.

The device 300 comprises circuitry 310. The circuitry 310 is configured to carry out functions of the device 300. The circuitry 310 may include a processor 312, such as for example a central processing unit (CPU), graphical processing unit (GPU), tensor processing unit (TPU), microcontroller, or microprocessor. The processor 312 is configured to execute program code. The program code may for example be configured to carry out the functions of the device 300.

The device 300 may further comprise a memory 320. The memory 320 may be one or more of a buffer, a flash memory, a hard drive, a removable media, a volatile memory, a non-volatile memory, a random access memory (RAM), or another suitable device. In a typical arrangement, the memory 320 may include a non-volatile memory for long term data storage and a volatile memory that functions as device memory for the circuitry 310. The memory 320 may exchange data with the circuitry 310 over a data bus. Accompanying control lines and an address bus between the memory 320 and the circuitry 310 also may be present.

Functions of the device 300 may be embodied in the form of executable logic routines (e.g., lines of code, software programs, etc.) that are stored on a non-transitory computer readable medium (e.g., the memory 320) of the device 300 and are executed by the circuitry 310 (e.g., using the processor 312). Furthermore, the functions of the device 300 may be a stand-alone software application or form a part of a software application that carries out additional tasks related to the device 300. The described functions may be considered a method that a processing unit, e.g., the processor 312 of the circuitry 310 is configured to carry out. Also, while the described functions may be implemented in software, such functionality may as well be carried out via dedicated hardware or firmware, or some combination of hardware, firmware and/or software.

The device 300 further comprises a first object detector 321 and a second object detector 321.

The circuitry 310 is configured to execute a changing function 323, and optionally an obtaining function 324.

The first object detector 321 is configured to perform first object detection comprising
 detecting an object in a first image frame of a video sequence, and determining a first probability score indicating a probability that the detected object in the first image frame belongs to the specific class.

The second object detector 322 is configured to perform second object detection comprising detecting an object in a second image frame of the video sequence, and determining a second probability score indicating a probability that the detected object in the second image frame belongs to the specific class, wherein the second image frame is subsequent to the first image frame in the video sequence.

The first object detector 321 has a higher object detection precision as compared to the second object detector 322, and the first object detector 321 requires a first processing time for performing the first object detection, the first processing time being longer as compared to a second processing time required by the second object detector 322 for performing the second object detection. Furthermore, the second object detection is performed in parallel with the first object detection.

The changing function 323 is configured to, on condition that the determined first probability score is below a first classification threshold and the determined second probability score is above a second classification threshold, performing one or more of reducing the first classification threshold and increasing the first probability score.

The first object detector 321 is further configured to, on condition that the increased first probability score is above the first classification threshold, the first probability score is above the reduced first classification threshold, or the increased first probability score is above the reduced first classification threshold, determine that the detected object in the first image frame belongs to the specific class.

In the first object detector 321, the object may be detected in a first region in the first image frame, and, in the second object detection function, the object may be detected in a second region in the second image frame. In the first object detector 321, performing one or more of reducing the first classification threshold and increasing the first probability score is then further conditioned on a distance from the second region to the first region being below a distance threshold.

The distance threshold may increase with increased distance in time between the first image frame and the second image frame in the video sequence.

The increase of the distance threshold may depend on the specific object class.

The circuitry 310 may be further configured to execute an obtaining function 324 configured to obtain a velocity of the detected object in the first image frame. The increase of the distance threshold may then depend on the obtained velocity.

The second object detector 322 may be further configured to performing third object detection comprising detecting an object in a third image frame of the video sequence, and determining a third probability score indicating a probability that the detected object in the third image frame belongs to the specific class, wherein the third image frame is subsequent to the first image frame in the video sequence. The first processing time is longer as compared to the second processing time added with a third processing time required by the second object detector 322 for performing the third object detection. The third object detection is performed in sequence with the second object detection and in parallel with the first object detection. In the changing function 323, performing one or more of reducing the first classification threshold and increasing the first probability score is further conditioned on the determined third probability score being above the second classification threshold.

The first object detector 321 may be further configured to mask the detected object determined to belong to the specific class in the first image frame.

One or both of the first object detector 321 and the second object detector 322 may be implemented as a first object detecting function and second object detecting function, respectively, that may be embodied in software that may be stored on a non-transitory computer readable medium, such as the memory 320, in the device 300, and executed by the circuitry 310 such as a processor 312 in the device 300. In alternative, one or both of the first object detector 321 and the second object detector 322 may be implemented in software that may be stored on a non-transitory computer readable medium of the device 300 other than the memory 320 and executed by circuitry other than the circuitry 310 of the device 300. In alternative, one or both of the first object detector 321 and the second object detector 322 may be implemented in hardware in the device 300. Furthermore, one or both of the first object detector 321 and the second object detector 322 may be implemented in a separate device from the device 300.

The detailed description of the acts of the method 100 described in relation to FIG. 1 and FIGS. 2A-2F hereinabove apply also for the corresponding functions of the device 300. Furthermore, the optional additional features of the method 100 described in relation to FIG. 1 and FIGS. 2A-2F hereinabove, when applicable, apply also to the device 300.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for determining that a detected object belongs to a specific class, the method comprising:
performing first object detection, using a first object detector, the first object detection comprising:
detecting an object in a first image frame of a video sequence, and
determining a first probability score indicating a probability that the detected object in the first image frame belongs to the specific class;
performing second object detection, using a second object detector, the second object detection comprising:
detecting an object in a second image frame of the video sequence, and
determining a second probability score indicating a probability that the detected object in the second image frame belongs to the specific class, wherein the second image frame is subsequent to the first image frame in the video sequence, wherein the first object detector has a higher object detection precision as compared to the second object detector, wherein the first object detector requires a first processing time for performing the first object detection, the first processing time being longer as compared to a second processing time required by the second object detector for performing the second object detection, and wherein the second object detection is performed in parallel with the first object detection;
on condition that the determined first probability score is below a first classification threshold and the determined second probability score is above a second classification threshold, performing at least one of reducing the first classification threshold or increasing the first probability score; and
on condition that the increased first probability score is above the first classification threshold, the first probability score is above the reduced first classification threshold, or the increased first probability score is above the reduced first classification threshold, the first object detector determining that the detected object in the first image frame belongs to the specific class.

2. The method according to claim 1, wherein, in the first object detection, the object in the first image frame is detected in a first region, and, in the second object detection, the object in the second image frame is detected in a second region, and wherein performing at least one of reducing the first classification threshold or increasing the first probability score is further conditioned on a distance from the second region to the first region being below a distance threshold.

3. The method according to claim 2, wherein the distance threshold increases with increased distance in time between the first image frame and the second image frame in the video sequence.

4. The method according to claim 3, wherein the increase of the distance threshold depends on the specific class.

5. The method according to claim 3, further comprising:
obtaining a velocity of the detected object in the first image frame,
wherein the increase of the distance threshold depends on the obtained velocity.

6. The method according to claim 1, further comprising:
performing third object detection, using the second object detector, the third object detection comprising:
  detecting an object in a third image frame of the video sequence, and
  determining a third probability score indicating a probability that the detected object in the third image frame belongs to the specific class, wherein the third image frame is subsequent to the first image frame in the video sequence, wherein the first processing time is longer as compared to the second processing time added with a third processing time required by the second object detector for performing the third object detection, and wherein the third object detection is performed in sequence with the second object detection and in parallel with the first object detection; and
wherein performing at least one of reducing the first classification threshold or increasing the first probability score is further conditioned on the determined third probability score being above the second classification threshold.

7. The method according to claim 1, further comprising:
masking, using the first object detector, the detected object in the first image frame determined to belong to the specific class.

8. A non-transitory computer-readable storage medium having stored thereon instructions for implementing a method, when executed in a device having a processor, the method for determining that a detected object belongs to a specific class, the method comprising:
performing first object detection, using a first object detector, the first object detection comprising:
  detecting an object in a first image frame of a video sequence, and
  determining a first probability score indicating a probability that the detected object in the first image frame belongs to the specific class;
performing second object detection, using a second object detector, the second object detection comprising:
  detecting an object in a second image frame of the video sequence, and
  determining a second probability score indicating a probability that the detected object in the second image frame belongs to the specific class, wherein the second image frame is subsequent to the first image frame in the video sequence, wherein the first object detector has a higher object detection precision as compared to the second object detector, wherein the first object detector requires a first processing time for performing the first object detection, the first processing time being longer as compared to a second processing time required by the second object detector for performing the second object detection, and wherein the second object detection is performed in parallel with the first object detection;
on condition that the determined first probability score is below a first classification threshold and the determined second probability score is above a second classification threshold, performing at least one of reducing the first classification threshold or increasing the first probability score; and
on condition that the increased first probability score is above the first classification threshold, the first probability score is above the reduced first classification threshold, or the increased first probability score is above the reduced first classification threshold, the first object detector determining that the detected object in the first image frame belongs to the specific class.

9. A device for determining that a detected object belongs to a specific class, the device comprising:
a first object detector configured to perform first object detection comprising:
  detecting an object in a first image frame of a video sequence, and
  determining a first probability score indicating a probability that the detected object in the first image frame belongs to the specific class;
a second object detector configured to perform second object detection comprising:
  detecting an object in a second image frame of the video sequence, and
  determining a second probability score indicating a probability that the detected object in the second image frame belongs to the specific class, wherein the second image frame is subsequent to the first image frame in the video sequence, wherein the first object detector has a higher object detection precision as compared to the second object detector, wherein the first object detector requires a first processing time for performing the first object detection, the first processing time being longer as compared to a second processing time required by the second object detector for performing the second object detection, and wherein the second object detection is performed in parallel with the first object detection; and
circuitry configured to execute:
a changing function configured to, on condition that the determined first probability score is below a first classification threshold and the determined second probability score is above a second classification threshold, performing one or more of reducing the first classification threshold and increasing the first probability score,
wherein the first object detector is further configured to, on condition that the increased first probability score is above the first classification threshold, the first probability score is above the reduced first classification threshold, or the increased first probability score is above the reduced first classification threshold, determine that the detected object in the first image frame belongs to the specific class.

10. The device according to claim 9, wherein, in the first object detector, the object in the first image frame is detected in a first region, and, in the second object detector, the object in the second image frame is detected in a second region, and wherein, in the first object detector, performing one or more of reducing the first classification threshold and increasing the first probability score is further conditioned on a distance from the second region to the first region being below a distance threshold.

11. The device according to claim 10, wherein the distance threshold increases with increased distance in time between the first image frame and the second image frame in the video sequence.

12. The device according to claim 11, wherein the increase of the distance threshold depends on the specific class.

13. The device according to claim 11, wherein the circuitry is further configured to execute:
 an obtaining function configured to obtain a velocity of the detected object in the first image frame, and
 wherein the increase of the distance threshold depends on the obtained velocity.

14. The device according to claim 9, wherein the second object detector is further configured to:
 performing third object detection comprising:
  detecting an object in a third image frame of the video sequence, and
  determining a third probability score indicating a probability that the detected object in the third image frame belongs to the specific class, wherein the third image frame is subsequent to the first image frame in the video sequence, wherein the first processing time is longer as compared to the second processing time added with a third processing time required by the second object detector for performing the third object detection, and wherein the third object detection is performed in sequence with the second object detection and in parallel with the first object detection;
 wherein, in the changing function, performing at least one of reducing the first classification threshold or increasing the first probability score is further conditioned on the determined third probability score being above the second classification threshold.

15. The device according to claim 9, wherein the first object detector is further configured to mask the detected object in the first image frame determined to belong to the specific class.

* * * * *